US008682134B2

(12) United States Patent
Otani

(10) Patent No.: US 8,682,134 B2
(45) Date of Patent: Mar. 25, 2014

(54) APPARATUS AND METHOD FOR PROCESSING MOVING IMAGE DATA

(75) Inventor: Daisuke Otani, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 108 days.

(21) Appl. No.: 13/348,860

(22) Filed: Jan. 12, 2012

(65) Prior Publication Data

US 2012/0189287 A1 Jul. 26, 2012

(30) Foreign Application Priority Data

Jan. 20, 2011 (JP) ................................ 2011-009429

(51) Int. Cl.
*H04N 5/77* (2006.01)
*H04N 5/765* (2006.01)
*H04N 5/92* (2006.01)
*H04N 5/93* (2006.01)

(52) U.S. Cl.
USPC ............ 386/224; 386/232; 386/326; 386/353

(58) Field of Classification Search
USPC ......... 386/239–248, 278–290, 326–342, 223, 386/232, 353–357
See application file for complete search history.

(56) References Cited

U.S. PATENT DOCUMENTS

| | | | |
|---|---|---|---|
| 2004/0081437 A1* | 4/2004 | Asada et al. | 386/131 |
| 2006/0083304 A1* | 4/2006 | Pan et al. | 375/240.08 |
| 2007/0091204 A1 | 4/2007 | Koshimizu et al. | |
| 2007/0206923 A1* | 9/2007 | Murakoshi et al. | 386/95 |
| 2008/0018783 A1* | 1/2008 | Chen et al. | 348/402.1 |
| 2010/0079620 A1 | 4/2010 | Kuriyama | |
| 2010/0119214 A1* | 5/2010 | Shimazaki et al. | 386/109 |

FOREIGN PATENT DOCUMENTS

| | | |
|---|---|---|
| JP | 2008-109245 A | 5/2008 |
| JP | 2010-87778 A | 4/2010 |

* cited by examiner

*Primary Examiner* — Hung Dang

(74) *Attorney, Agent, or Firm* — Holtz, Holtz, Goodman & Chick, PC

(57) ABSTRACT

An apparatus for processing a moving image including: an acquiring section which acquires moving image data of an object imaged at a predetermined imaging frame rate; an identifying section which applies a predetermined analysis process to the moving image data and identifies a first frame image among a plurality of first frame images and second frame images constituting the moving image data, wherein the first frame images are to be reproduced in slow motion, and the second frame images are frame images other than the first frame images; and a processor which performs a frame-number reduction process to reduce the number of the second frame images at a predetermined ratio.

14 Claims, 4 Drawing Sheets

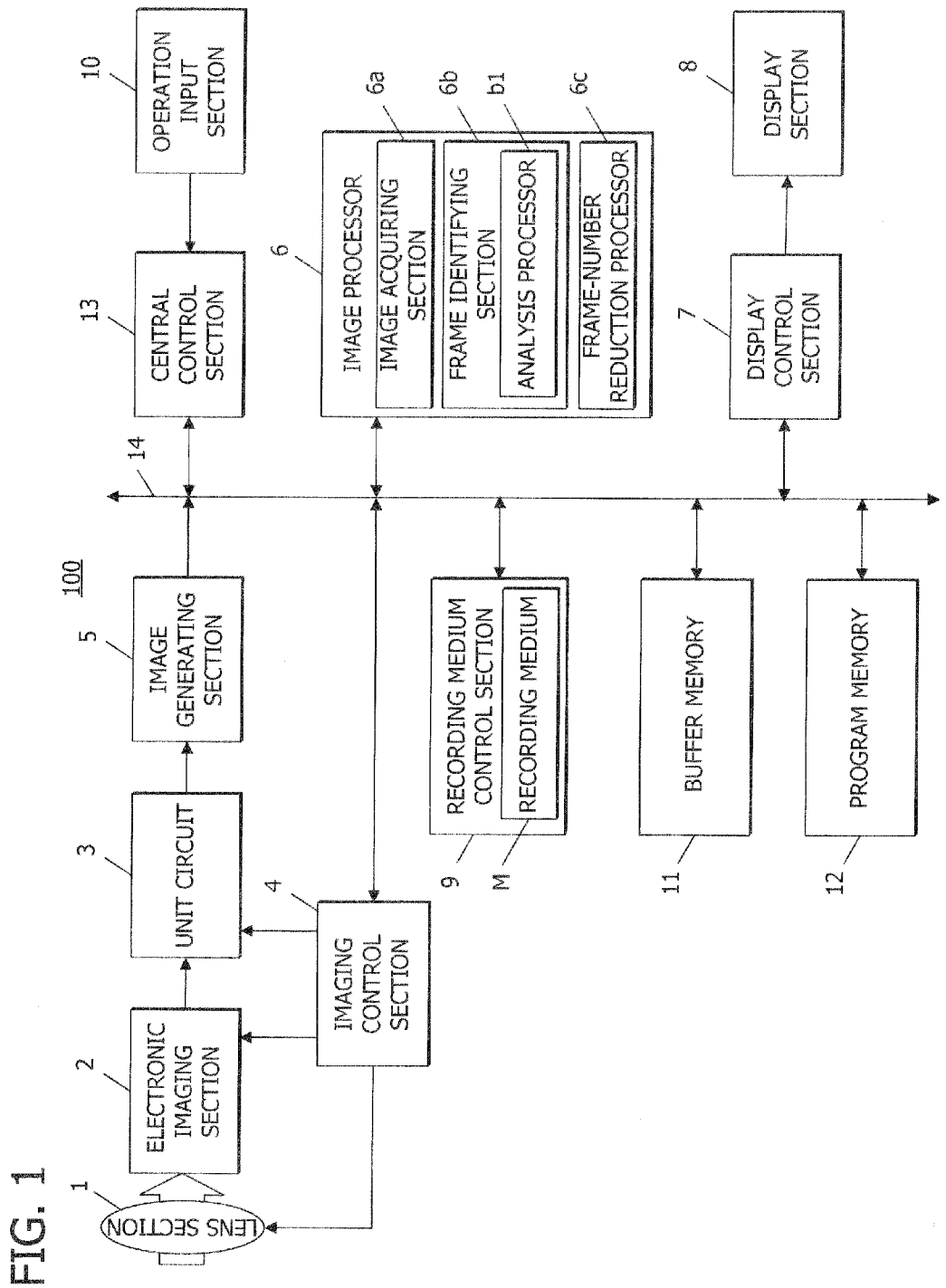

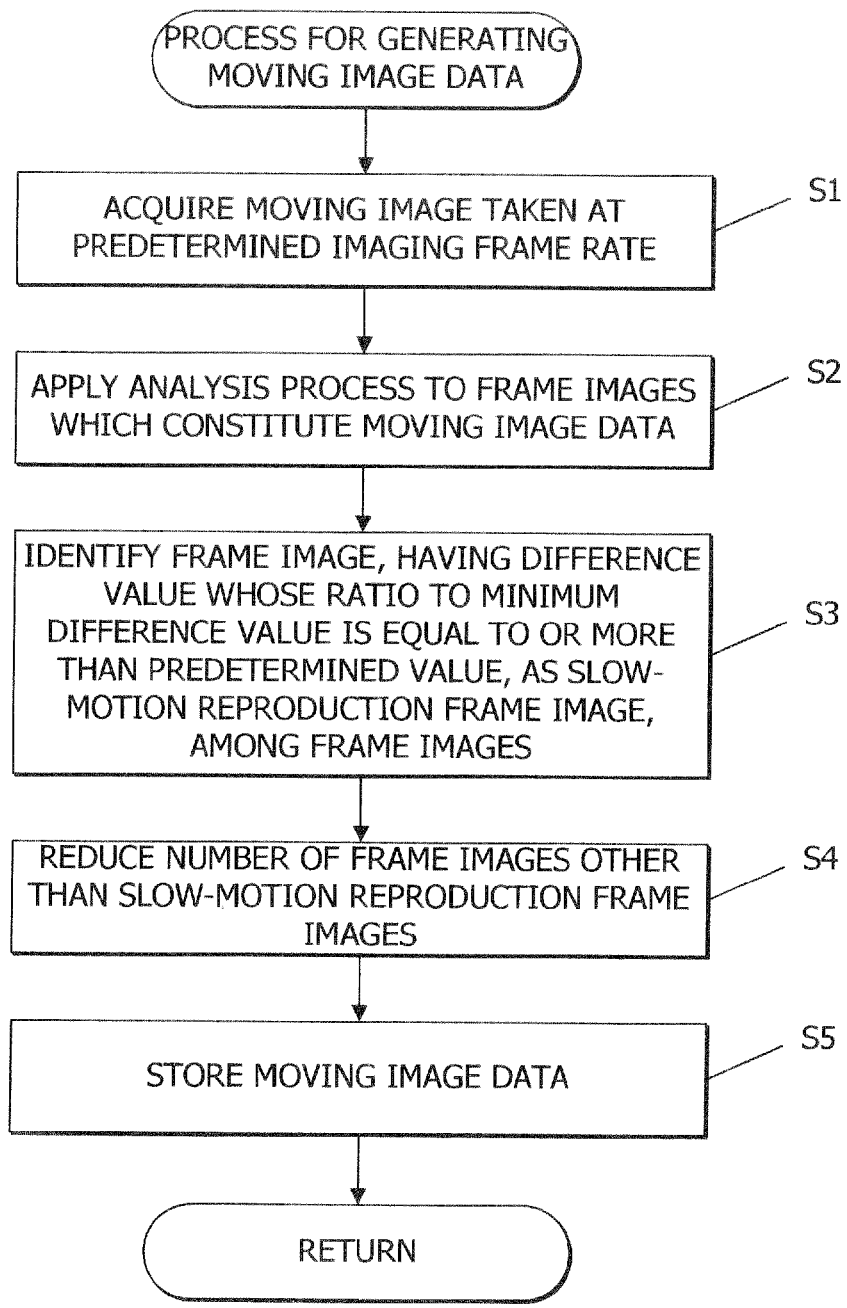

APPARATUS AND METHOD FOR PROCESSING MOVING IMAGE DATA

BACKGROUND OF THE INVENTION

1. Field of the Invention

The present invention relates to an apparatus and a method for processing a moving image capable of adjusting a reproduction speed of moving image data.

2. Description of Related Art

Moving image processing apparatuses are known which can switch an imaging frame rate to a predetermined imaging frame rate corresponding to a normal imaging mode or to an imaging frame rate higher than the normal imaging frame rate (for example, see Japanese Unexamined Patent Application Publication No. 2010-87778). When a moving image taken with such an imaging apparatus at a high imaging frame rate is reproduced at a low reproduction frame rate, the moving image is seen as a moving image taken in slow motion.

It is troublesome to switch an imaging frame rate in order to shoot a scene to be reproduced in slow motion during taking a moving image at a predetermined imaging frame rate corresponding to a normal imaging mode. Additionally, even when the imaging frame rate is switched, a scene before and after a scene to be reproduced in slow motion is also unintentionally taken at an imaging frame rate corresponding to slow motion.

There has been demand for acquiring moving image data, a part of which can be reproduced in slow motion, without any specific operation by a user during imaging and recording of moving image data.

SUMMARY OF THE INVENTION

According to a first aspect of the present invention, there is provided an apparatus for processing a moving image including: an acquiring section which acquires moving image data of an object imaged at a predetermined imaging frame rate; an identifying section which applies a predetermined analysis process to the moving image data acquired by the acquiring section and identifies a first frame image among a plurality of first frame images and second frame images constituting the moving image data, wherein the first frame images are to be reproduced in slow motion, and the second frame images are frame images other than the first frame images; and a processor which performs a frame-number reduction process to reduce the number of the second frame images at a predetermined ratio.

According to a second aspect of the present invention, there is provided a method for processing a moving image using an apparatus, the method including: (a) acquiring moving image data of an object imaged at a predetermined imaging frame rate; (b) applying a predetermined analysis process to the acquired moving image data and identifying a first frame image among a plurality of first frame images and second frame images constituting the moving image data, wherein the first frame images are to be reproduced in slow motion, and the second frame images are frame images other than the first frame images; and (c) performing a frame-number reduction process to reduce the number of the second frame images at a predetermined ratio.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 1 is a schematic block diagram illustrating a configuration of an imaging apparatus in accordance with a first embodiment of the present invention;

FIG. 2 is a flowchart illustrating exemplary operations of process for generating moving image data with the imaging apparatus in FIG. 1;

DESCRIPTION OF THE PREFERRED EMBODIMENTS

Figure 3A:
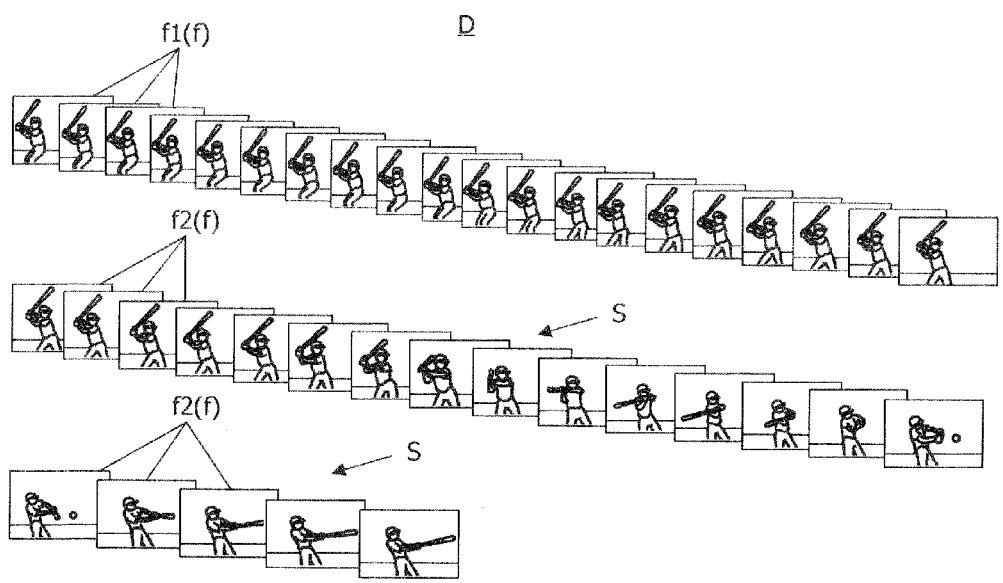
FIG. 3A is a view for explaining the process for generating moving image data in FIG. 2 and shows the moving image data composed of a plurality of frame images.

The embodiments of the present invention will be described below in detail with reference to the accompanying drawings. However, the scope of the present invention is not limited to examples shown in these drawings.

FIG. 1 is a schematic block diagram illustrating a configuration of an imaging apparatus 100 in accordance with an embodiment of the present invention.

The imaging apparatus 100 applies a predetermined analysis process to moving image data D to identify slow-motion reproduction frame images S (first frame images), which are to be reproduced in slow motion, among a plurality of frame images f, . . . which constitute the moving image data D. Then, the imaging apparatus 100 reduces the number of frame images f other than the slow-motion reproduction frame images S (second frame images) at a predetermined ratio.

As shown in FIG. 1, the imaging apparatus 100 includes, for example, a lens section 1, an electronic imaging section 2, a unit circuit 3, an imaging control section 4, an image generating section 5, an image processor 6, a display control section 7, a display section 8, a recording medium control section 9, an operation input section 10, a buffer memory 11, a program memory 12, and a central control section 13.

The imaging control section 4, the image generating section 5, the image processor 6, the display control section 7, the recording medium control section 9, the buffer memory 11, the program memory 12, and the central control section 13 are mutually connected through a bus line 14.

The lens section 1 includes, for example, a zoom lens, a focus lens, and a diaphragm, which are not shown in the drawing, and provides an optical image of an object through these lenses.

The electronic imaging section 2 is located on the optical axis of the lens section 1. The electronic imaging section 2 is composed of an image sensor such as a CCD (charge coupled device) or a CMOS (complementary metal-oxide semiconductor). The electronic imaging section 2 converts an optical image passing through the lenses of the lens section 1 into two-dimensional image signals (RGB image data) with a predetermined period to output the signals to the unit circuit 3.

The unit circuit 3 includes, for example, a CDS (correlated double sampling) circuit module, an AGC (auto gain control) amplifier, and an ADC (analog to digital converter), which are not shown in the drawing. The unit circuit 3 holds analog image signals corresponding to an optical image of the object outputted from the electronic imaging section 2 and inputted to the unit circuit 3 with a predetermined period corresponding to an imaging frame rate by using the CDS circuit module; amplifies the image signals by using the AGC amplifier; and then, converts the amplified image signals into digital image signals by using the ADC. The unit circuit 3 then transmits the digital image signals to the image generating section 5.

The imaging control section 4 controls the operations of, for example, the lens section 1, the electronic imaging section 2, and the unit circuit 3.

In detail, the imaging control section 4 includes, for example, a drive source such as a motor and a driver for driving the drive source, which are not shown in the drawing, and drives the zoom lens and the focus lens of the lens section 1 in the optical axial direction. The imaging control section 4 also includes, for example, a diaphragm driver (not shown in the drawing) for adjusting the size of the aperture of the diaphragm of the lens section 1 depending on the exposure condition. The imaging control section 4 also includes, for example, a TG (timing generator) and a driver for driving the electronic imaging section 2, which are not shown in the drawing, and controls operational timing of the electronic imaging section 2 through the TG and the driver depending on a drive frame rate and an imaging condition (for example, exposure time). The imaging control section 4 also controls operational timing of the unit circuit 3 according to the imaging frame rate.

The image generating section 5 generates digital brightness signals Y and digital color-difference signals Cb and Cr (YUV data) on the basis of the digital image signals transmitted from the unit circuit 3.

In detail, the image generating section 5 applies a color process including a pixel interpolation process and a γ correction process to digital image data of each frame image f transmitted from the unit circuit 3 with a predetermined period (for example, 1/240 sec) corresponding to the imaging frame rate using a color process circuit (not shown in the drawing), and then generates the digital brightness signals Y and the digital color-difference signals Cb and Cr (YUV data). The image generating section 5 then outputs image data of the generated brightness/color-difference signals to the imaging control section 4 and the image processor 6.

In this embodiment, the imaging frame rate for imaging a moving image is exemplified as 240 fps (frames per second) but is not limited to this value and can be changed to any proper value.

The image processor 6 includes an image acquiring subsection 6a, a frame identifying section 6b, and a frame-number reduction processor 6c.

The image acquiring subsection 6a acquires the moving image data D of the object.

In detail, the image acquiring subsection 6a acquires the image data (YUV data) generated by the image generating section 5. In other words, when a moving image of the object is taken, the image acquiring subsection 6a acquires the image data (moving image data D) of each frame image f generated by the image generating section 5 on the basis of the digital image signal transmitted from the unit circuit 3 with a predetermined period (for example, 1/240sec) corresponding to the imaging frame rate.

Here, the imaging frame rate for the moving image data D is higher than a predetermined reproduction frame rate which is set for reproducing moving image data on the display section 8. In other words, a period for imaging each frame image is shorter than a period for switching (reproducing) each frame image corresponding to the reproduction frame rate.

As described above, the image acquiring subsection 6a constitutes an acquiring section which acquires the moving image data D of the object composed of a plurality of frame images f, . . . imaged at a predetermined imaging frame rate.

The frame identifying section 6b identifies the slow-motion reproduction frame images S among a plurality of frame images f, . . . which constitute the moving image data D.

In detail, the frame identifying section 6b includes an analysis processor b1 applying a predetermined analysis process to the moving image data D acquired by the image acquiring subsection 6a and identifies the slow-motion reproduction frame images S on the basis of the analysis result obtained by the analysis processor b1.

The analysis processor b1 applies a predetermined analysis process for detecting a change in state of the object among a plurality of frame images f, which constitute the moving image data D. In detail, the analysis processor b1 calculates a difference in each corresponding pixel between two adjacent frame images f (for example, between one frame image and another frame image which is taken at timing immediately prior to the one frame image) among a plurality of frame images f, . . . . The analysis processor b1 then generates a difference value representing each frame image f by a predetermined calculation on the basis of the calculated difference in each pixel for each of a plurality of frame images f, . . . .

For this difference value representing each frame image f, a maximum value, a median value, or an average value of the differences in the pixels may be used.

This analysis process is merely one example, and the present invention is not limited to this example. This process can be replaced with any proper process as long as the process enables the detection of a change in state of the object among a plurality of frame images f, . . . . For example, this analysis processor b1 may also detect a change in brightness of the object as a change in state of the object among a plurality of frame images f, . . . on the basis of brightness values of a plurality of frame images f, . . . .

The frame identifying section 6b identifies a frame image f, containing an object whose change in state corresponds to equal to or more than a predetermined value, as the slow-motion reproduction frame S in a plurality of frame images f, . . . which constitute the moving image data D, on the basis of the analysis result obtained by the analysis processor b1.

In detail, the frame identifying section 6b identifies a minimum difference value on the basis of a difference value representing each frame image f generated by the analysis processor b1 and calculates the ratio of the difference value representing each frame image f to the minimum difference value. The frame identifying section 6b then identifies a frame image f, having a difference value whose ratio to the minimum value is equal to or more than the predetermined value (for example, equal to two), as the slow-motion reproduction frame S to be reproduced in slow motion among a plurality of frame images f, . . . .

Here, the slow-motion reproduction frame images S mean a part composed of frame images f which are to be reproduced at a lower speed (slow motion) than the actual speed. In other words, the slow-motion reproduction frame images S mean a part composed of frame images f wherein the interval between frame images f in reproducing moving image is longer than the interval between frame images f when the moving image is taken.

For example, as shown in FIG. 3A, in the case of the moving image data D composed of a plurality of frame images f, . . . (for example, 40 frame images) obtained by imaging a batting form of baseball at a predetermined imaging frame rate (for example, 240 fps), frame images f1 at the start of swinging have a minimum difference value. After the start of the swinging, a change in state (movement) of the object for a predetermined time length increases. In this case, frame images f2, which correspond to the object after the start of the swinging, have a difference value whose ratio to the minimum difference value (a ratio to minimum difference value) is equal to or more than the predetermined value (for example, equal to two; see FIG. 3B). Thus, the frame images f2 are identified as the slow-motion reproduction frame images S.

As described above, the frame identifying section 6b constitutes an identifying section which applies the predetermined analysis process to the moving image data D acquired by the image acquiring subsection 6a and identifies the slow-motion reproduction frame images S composed of a plurality of frame images f, . . . to be reproduced in slow motion among a plurality of frame images f, . . . which constitute the moving image data D.

The frame-number reduction processor 6c reduces the number of frame images f other than the slow-motion reproduction frame images S among a plurality of frame images f, . . . which constitute the moving image data D at the predetermined ratio.

In detail, the frame-number reduction processor 6c reduces the number of frame images f other than the slow-motion reproduction frame images S such that a time required to reproduce the frame images f (i.e., to switch each of the frame images f) at a predetermined reproduction frame rate corresponds to an actual time spent on taking the frame images f. The predetermined reproduction frame rate means a frame rate which has a period longer (i.e., lower speed) than the period for imaging the frame images f (i.e., longer than the period of a predetermined imaging frame rate). Specifically, the frame-number reduction processor 6c reduces the number of the frame images f other than the slow-motion reproduction frame images S according to a predetermined ratio (for example, ⅛) between the imaging frame rate (for example, 240 fps) and the reproduction frame rate (for example, 30 fps). For example, as shown in FIG. 3A, the object in the frame images f1 at the start and the end (not shown in the drawing) of the swinging has a small change in state (movement) for the predetermined time length. In this case, a certain proportion (according to the predetermined reproduction frame rate) of frame images are removed from the frame images f1 reflecting on the small change in state.

Thereby, a time required to reproduce the frame images f other than the slow-motion reproduction frame images S at a predetermined reproduction frame rate (for example, 30 fps) corresponds to an actual time spent on taking the frame images f at the predetermined imaging frame rate (for example, 240 fps).

In the embodiment described above, the frame-number reduction processor 6c does not reduce the number of the slow-motion reproduction frame images S, but reduces the number of frame images f other than the slow-motion reproduction frame images S such that a time required to reproduce the frame images f other than the slow-motion reproduction frame images S at a predetermined reproduction frame rate corresponds to an actual time spent on taking the frame images f. Thereby, the reproduction speed can be controlled naturally and effectively. However, the control of whether to reduce the number of frame images f or the control of the frame-number reduction is merely one example, and the present invention is not limited to this example. This control can be replaced with any proper control as long as the frame-number reduction is controlled so that the reproduction speed for the slow-motion reproduction frame images S is lower than the reproduction speed for frame images f other than the slow-motion reproduction frame images S. That is, the number of the slow-motion reproduction frame images S may also be reduced at a lower ratio than that for the frame images f other than the slow-motion reproduction frame images S. Alternatively, the frame-number reduction ratio may be determined such that the reproduction time for the frame images f other than the slow-motion reproduction frame images S is different from the actual time spent on taking the frame images f.

For example, the frame-number reduction processor 6c may control a frame-number reduction ratio for the slow-motion reproduction frame images S and the frame images f other than the slow-motion reproduction frame images S such that the frame-number reduction ratio becomes lower as a change in state of frame images f becomes larger (that is, the movement is faster), based on a result of the predetermined analysis process. In detail, for example, the frame-number reduction processor 6c may identify a change in state of each frame image f on the basis of a difference value (for example, the maximum value for difference values of respective pixels) representing each frame image f generated by the analysis processor b1 of the frame identifying section 6b; and control the frame-number reduction ratio such that the frame-number reduction ratio becomes lower as a change in state of frame images f becomes larger.

As described above, the frame-number reduction processor 6c constitutes a processor which reduces the number of frame images f other than the slow-motion reproduction frame images S identified by the frame identifying section 6b, among a plurality of frame images f, . . . which constitute the moving image data D at the predetermined ratio.

The image processor 6 also includes, for example, an encoder and a decoder, which are not shown in the drawing.

The encoder compresses and encodes the image data (YUV data) generated by the image generating section 5 on the basis of a predetermined encoding format (for example, a Motion-JPEG format). In detail, the encoder compresses and encodes the moving image data D, on which the frame-number reduction process has been performed by the frame-number reduction processor 6c, on the basis of the predetermined encoding format.

The decoder decodes the encoded image data read out from the recording medium control section 9 on the basis of a decoding format corresponding to the encoding format when, for example, the encoded image data recorded on a recording medium M is to be recorded.

The display control section 7 controls the operations for reading out image data temporarily stored in the buffer memory 11 to be displayed and displaying the image data on the display section 8.

In detail, the display control section 7 includes, for example, a VRAM (video random access memory), a VRAM controller and a digital video encoder. The digital video encoder reads out brightness signals Y and color-difference signals Cb and Cr of a plurality of frame images f, . . . which constitute moving image read out from the buffer memory 11 and stored in the VRAM (not shown in the drawing) through the VRAM controller from the VRAM at a predetermined reproduction frame rate (for example, 30 fps), generates video signals on the basis of these data, and outputs the video signals to the display section 8.

When the reproduction frame rate is fixed to a predetermined value, a reproduction speed appears to vary in accordance with the number of inputted frame images f of the moving image data D per second. For example, when frame images f are inputted whose imaging interval and reproduction interval are equal to each other, the reproduction speed is normal which speed appears to correspond to the actual speed; on the other hand, when frame images f are inputted whose imaging interval is smaller than the reproduction interval, the moving image appears to be reproduced in slow motion, wherein the speed appears lower than the actual speed.

The display section 8 is composed of, for example, a liquid crystal display panel and displays an image taken with the electronic imaging section 2 on its display screen on the basis of video signals from the display control section 7. In detail, the display section 8 displays a live view image while consecutively updating a plurality of frame images f, . . . generated by imaging an object with the electronic imaging section 2 and the imaging control section 4 at a predetermined frame rate, in a still image imaging mode or a moving image imaging mode. The display section 8 also displays a plurality of frame images f, . . . in the middle of recording as a moving image or displays an image (rec view image) recorded as a still image.

The recording medium control section 9 enables the recording medium M to be loaded thereinto and unloaded therefrom and controls the operations for reading out data from and writing data onto the loaded recording medium M.

In detail, the recording medium control section 9 records image data to be recorded onto the recording medium M, the image data being encoded by the encoder (not shown in the drawing) of the image processor 6 on the basis of a predetermined compression format (for example, a Motion-JPEG format).

The recording medium M is composed of, for example, a nonvolatile memory (flash memory). However, the present invention is not limited to this example. The recording medium M can be composed of any proper devices.

The operation input section 10 receives predetermined operations for the imaging apparatus 100. In detail, the operation input section 10 is related to instructions to image an object, which includes, for example, a shutter button operated with a half push and a full push, a selection button for selecting the imaging modes, functions, and the like, a zoom button for adjusting a zoom amount (which are not shown in the drawing). The operation input section 10 outputs predetermined operation signals to the central control section 13 in response to operations for these buttons.

The buffer memory 11, which is used for temporarily storing image data and the like, is also used as a working memory for the central control section 13, for example.

The program memory 12 stores programs and data for functions of the imaging apparatus 100 therein.

The central control section 13 controls the sections of the imaging apparatus 100. In detail, the central control section 13 includes a CPU (not shown in the drawing) for controlling the sections of the imaging apparatus 100 and controls the operations on the basis of programs (not shown in the drawing) for processing.

Figure 3B:
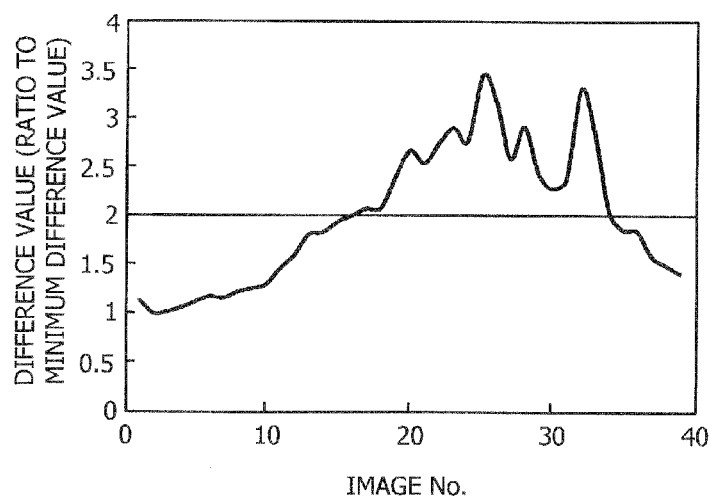
FIG. 3B is a graph for explaining the process for generating moving image data in FIG. 2 and shows a ratio to minimum difference value for each frame image in the moving image data.

Next, the process for generating the moving image data with the imaging apparatus 100 will be described below with reference to FIGS. 2, 3A, and 3B.

FIG. 2 is a flowchart illustrating exemplary operations of processes for generating moving image data. FIGS. 3A and 3B are a view and a graph, respectively, for explaining the process for generating moving image data.

In the following description, the process for generating moving image data is performed when a user push the selection button to select a mode for generating the moving image data D from multiple imaging modes; or the process for generating moving image data is automatically performed after taking the moving image of the object.

As shown in FIG. 2, the image acquiring subsection 6a of the image processor 6 acquires the already recorded moving image data D composed of a plurality of frame images f, . . . taken at the predetermined imaging frame rate (Step S1).

Specifically, the image acquiring subsection 6a acquires image data (YUV data) of each frame image f which is taken at the predetermined imaging frame rate (for example, 240 fps) through the lens section 1, the electronic imaging section 2, and the unit circuit 3 under control of the imaging control section 4; and which is generated by the image generating section 5. In detail, the moving image data D is acquired, wherein the moving image data D is generated by the image generating section 5 based on digital image signals transmitted from the unit circuit 3 with a predetermined period (for example, 1/240 sec) corresponding to the imaging frame rate and compressed and encoded by the encoder to be recorded on the recording medium M. The acquired moving image data D is expanded and decoded by the decoder to thereby obtain image data of each frame image f which constitutes the moving image data D.

The analysis processor b1 then applies the predetermined analysis process to a plurality of frame images f, . . . which constitute the moving image data D (Step S2).

In detail, the analysis processor b1 calculates a difference in each corresponding pixel between two adjacent frame images f, . . . (for example, between one frame image and another frame image which is taken at timing immediately prior to the one frame image) for each frame image f and generates a difference value representing each frame image f by a predetermined calculation on the basis of the calculated difference in each pixel.

The frame identifying section 6b subsequently identifies the slow-motion reproduction frame images S on the basis of the analysis result obtained by the analysis processor b1 (Step S3).

In detail, the frame identifying section 6b calculates the ratio of a difference value, which represents each frame image f generated by the analysis processor b1, to a minimum difference value; and identifies a frame image f, having a difference value whose ratio to the minimum difference value is equal to or more than a predetermined value (for example, equal to two), as the slow-motion reproduction frame S, among a plurality of frame images f, . . . (For example, in FIG. 3A, a frame image f reflecting a large movement of the upper body after the start of the swinging is identified as the slow-motion reproduction frame S.)

The frame-number reduction processor 6c then reduces the number of frame images f other than the slow-motion reproduction frame images S among a plurality of frame images f, . . . which constitute the moving image data D such that a time required to reproduce the frame images f at a predetermined reproduction frame rate corresponds to an actual time spent on taking the frame images f (Step S4).

Specifically, the frame-number reduction processor 6c reduces the number of the frame images f other than the slow-motion reproduction frame images S according to a predetermined ratio (for example, 1/8) between the imaging frame rate and the reproduction frame rate (for example, 30 fps). The frame images f other than the slow-motion reproduction frame images S are, for example, frame images f1 at the start and the end of the swinging shown in FIG. 3A.

The encoder of the image processor 6 subsequently compresses and encodes the moving image data D, on which the frame-number reduction process has been performed by the frame-number reduction processor 6c, on the basis of the predetermined encoding format and then transfers the moving image data D to the recording medium control section 9. The recording medium control section 9 records the moving image data D on the recording medium M again (Step S5). The recording medium control section 9 may enable a user to select one of the following two ways: one is overwriting the original moving image data D with the new moving image data D, the other is storing the new moving image data D as separate new data, in recording the moving image data D again.

Through these steps, the process for generating moving image data is completed.

The steps of analyzing with the analysis processor b1, identifying with the frame identifying section 6b, reducing the number of frames with the frame-number reduction processor 6c, compressing and encoding with the image processor 6, and repetitive recording on the recording medium M may be performed after expanding and decoding all the frame images f included in the moving image data D. Alternatively, these steps may be performed while frame images f included in the moving image data D are expanded one by one. These steps may also be performed in parallel with reproducing and displaying the moving image data D. If these steps are not performed in parallel with the reproducing and displaying, the frame images f do not have to be processed in the order from the first image but can be processed in any order.

As described above, the imaging apparatus 100 in the first embodiment records entire moving image data at the higher predetermined imaging frame rate than the predetermined reproduction frame rate for reproducing the moving image data. Then, the imaging apparatus 100 acquires the moving image data D wherein any part of the moving image data D can be reproduced in slow motion (with respect to actual speed) without decreasing the reproduction frame rate (i.e., maintaining the smooth moving image). Then, the imaging apparatus 100 applies the predetermined analysis process to the moving image data D, identifies the slow-motion reproduction frame images S to be reproduced in slow motion among a plurality of frame images f, . . . which constitute the moving image data D, and reduces the number of frame images f other than the slow-motion reproduction frame images S at the predetermined ratio. Thereby, it is possible to acquire moving image data, a part of which can be reproduced in slow motion without switching the imaging frame rate during imaging of the moving image data by a user. Additionally, even when images are taken and recorded at the predetermined high imaging frame rate, the moving image data can be reduced to an ultimately-required volume. In particular, in the first embodiment, the ratio between the reproduction frame rate and the imaging frame rate is determined such that a slow-motion reproduction is performed in a proper speed even when the number of the slow-motion reproduction frame images S is not reduced. Further, in the first embodiment, the number of the frame images f other than the slow-motion reproduction frame images S is reduced such that a time required to reproduce the frame images f at the predetermined reproduction frame rate corresponds to an actual time spent on taking the frame images f. According to such a configuration, the data volume of the moving image data D can be efficiently reduced. Additionally, the reproduced moving image data D appears to be smoother.

Additionally, the moving image data D, a part of which can be reproduced in slow motion, is stored in either of the following two ways: one is overwriting the original moving image data D with the new moving image data D, the other is storing the new moving image data D as separate new data. Therefore, it is not necessary to perform the analysis process and the frame-number reduction process again, and further, it is possible to reproduce the edited moving image data D even with an ordinary moving image reproduction apparatus not having specific functions such as those of the imaging apparatus 100, in a similar manner to the imaging apparatus 100.

Further, a frame image f, containing an object whose change in state corresponds to equal to or more than a predetermined value, is identified as the slow-motion reproduction frame S in a plurality of frame images f, . . . which constitute the moving image data D. In detail, a frame image f, having a difference value whose ratio to the minimum difference value is equal to or more than a predetermined value, is identified as the slow-motion reproduction frame S, among a plurality of frame images f, . . . which constitute the moving image data D. Therefore, the slow-motion reproduction frame images S to be reproduced at a low reproduction frame rate can be properly identified on the basis of a change in state of the object among a plurality of frame images f, . . . .

Alternatively, instead of dividing a plurality of frame images into the slow-motion reproduction frame images S and frames other than the slow-motion reproduction frame images S, i.e., instead of dividing a plurality of frame images into frame images without undergoing the frame-number reduction process and frame images undergoing the frame-number reduction process at a frame-number reduction ratio obtained based on an actual time, the imaging apparatus 100 may be configured so that a level of slow motion is identified for each frame image f which constitutes the moving image data D, and so that a frame-number reduction ratio for each frame image f is varied on a several-point scale depending on the level of slow motion.

Specifically, the frame-number reduction ratio is controlled on a several-point scale such that the frame-number reduction ratio becomes lower as a change in state of a frame image f becomes larger for each of the slow-motion reproduction frame images S and frames other than the slow-motion reproduction frame images S. Therefore, the moving image data D can be generated taking a change in state of the object into consideration. This can prevent the unnaturalness of the reproduced moving image caused by failure to apply the frame-number reduction process to the slow-motion reproduction frame images S or by reducing the number of the frame images f other than the slow-motion reproduction frame images S at the constant predetermined ratio, for example, when the movement of the object changes intermittently or when the degree of movement of the object changes smoothly.

The present invention is not limited to this embodiment and may be changed or modified without departing from the scope and spirit of the present invention.

Modifications of the imaging apparatus 100 will be described below.

<Modification 1>

An imaging apparatus 100 in Modification 1 identifies slow-motion reproduction frame images S on the basis of a portion whose change in state is the largest in each of a plurality of frame images f, . . . which constitute moving image data D.

In detail, an analysis processor b1 of a frame identifying section 6b calculates motion vectors in the predetermined number of block areas which have distinctive characteristic (characteristic points) in each of a plurality of frame images f, . . . which constitute the moving image data D in a predetermined analysis process and then identifies a block area having a motion vector corresponding to the highest degree of change in state (largest-change portion) among these motion vectors. The analysis processor b1 then identifies the motion vector in the identified block area as the degree of change in state in each frame image f. In the bat swing as an example shown in FIG. 3A, for example, a portion including the face, a portion including the bat, or a portion including the ball in the frame image is extracted as block areas which have distinctive characteristic through an outline extraction process or an image recognition process. Alternatively, a user may preliminarily select portions to be extracted such as "a bat portion".

The frame identifying section 6b identifies a frame image f, having the degree of change in state equal to or more than a predetermined value, as the slow-motion reproduction frame images S, among a plurality of frame images f, . . . . In detail, the frame identifying section 6b calculates a maximum value and a minimum value among the magnitudes of the motion vectors identified with the analysis process applied to the respective frame images f, . . . and sets a threshold value based on the maximum and minimum values. Specifically, the threshold value is a predetermined percentage (for example, about 10%) from the maximum value in the difference between the maximum value and the minimum value. The frame identifying section 6b then identifies frame images f each of which includes a motion vector equal to or less than the threshold value and which last for a predetermined length of time or longer, as the slow-motion reproduction frame images S, among a plurality of frame images f, . . . .

Next, the process for generating moving image data in this modification will be described below with reference to FIG. 4.

Figure 4:
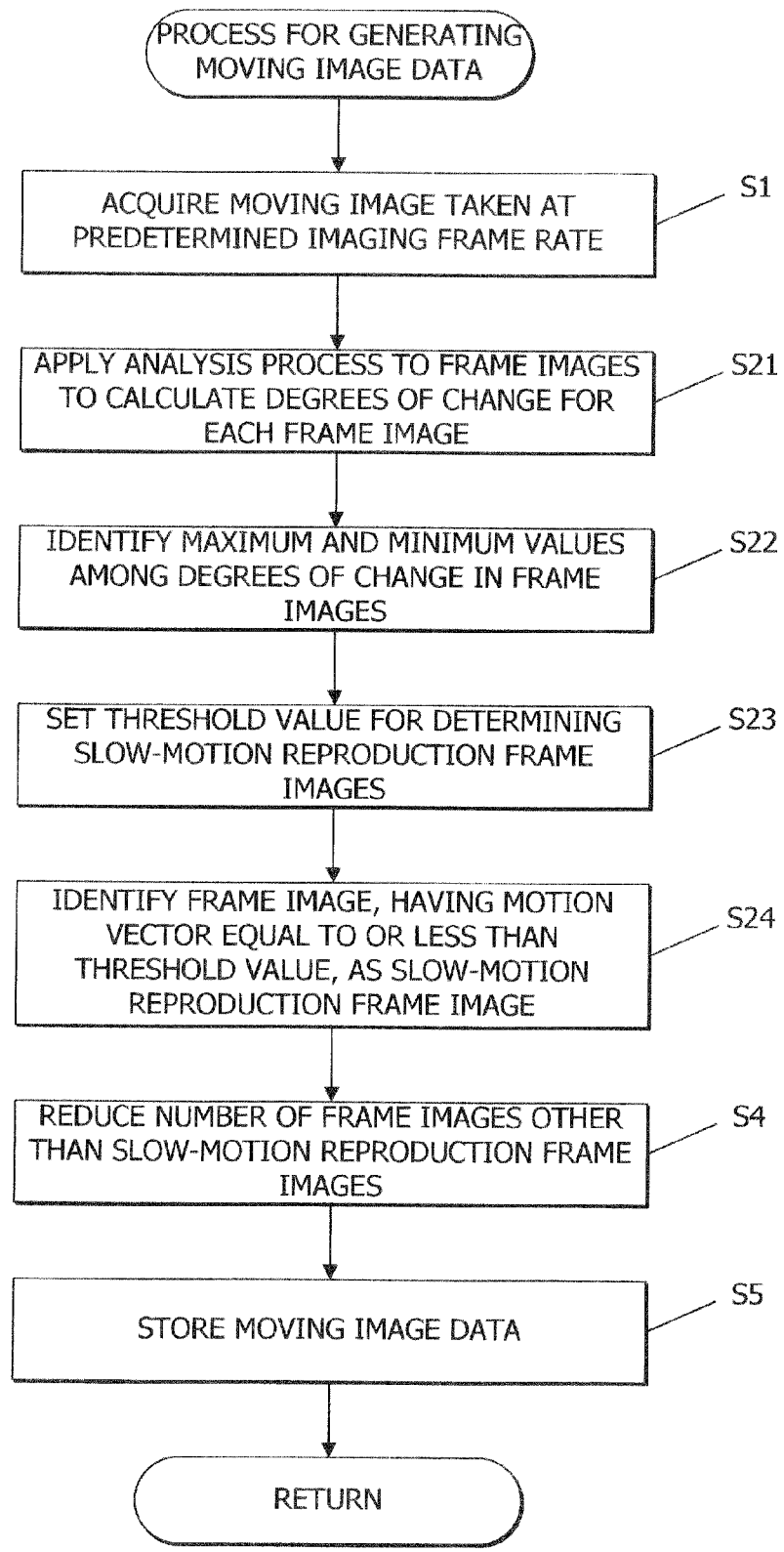
FIG. 4 is a flowchart illustrating exemplary operations in a modification of processes for generating moving image data.

As shown in FIG. 4, an image acquiring subsection 6a of an image processor 6 acquires the moving image data D composed of a plurality of frame images f, . . . taken at a predetermined imaging frame rate similarly to the first embodiment (Step S1).

The analysis processor b1 of the frame identifying section 6b then applies the predetermined analysis process to a plurality of frame images f, . . . which constitute the moving image data D (Step S21).

In detail, the analysis processor b1 calculates motion vectors in the predetermined number of block areas which have distinctive characteristic (characteristic points) for each of a plurality of frame images f. The analysis processor b1 then identifies a block area having the highest degree of change in state among the block areas and identifies a motion vector in the identified block area as the degree of change in state in each frame image f.

The frame identifying section 6b subsequently calculates the maximum value and the minimum value among the magnitude of the motion vectors in the frame images f, . . . on the basis of the analysis result obtained by the analysis processor b1 (Step S22) and then sets a threshold value based on the maximum and minimum value s (Step S23). Specifically, the threshold value, which is a relative threshold value for determining the slow-motion reproduction frame images S, is a predetermined percentage (for example, about 10%) from the maximum value in the difference between the maximum value and the minimum value.

The frame identifying section 6b then identifies frame images f having a motion vector equal to or less than the threshold value among a plurality of frame images f, . . . and identifies frame images f each of which includes a motion vector equal to or less than the threshold value and which last for a predetermined length of time or longer, as the slow-motion reproduction frame images S, among a plurality of frame images f, . . . (Step S24).

Similarly to the first embodiment, the frame-number reduction processor 6c then reduces the number of frame images f other than the slow-motion reproduction frame images S among a plurality of frame images f, . . . which constitute the moving image data D such that a time required to reproduce the frame images f at the predetermined reproduction frame rate corresponds to an actual time spent on taking the frame images f (Step S4). Similarly to the first embodiment, an encoder of the image processor 6 subsequently compresses and encodes the moving image data D, on which the frame-number reduction process has been performed by the frame-number reduction processor 6c, on the basis of a predetermined encoding format and then transfers the moving image data D to a recording medium control section 9. The recording medium control section 9 records the moving image data D on a recording medium M (Step S5).

Through these steps, the process for generating moving image data is completed.

As described above, the imaging apparatus 100 in Modification 1 detects a portion having the highest degree of change in state in each of a plurality of frame images f, . . . which constitute moving image data D and identifies a frame image f, whose largest-change portion corresponds to equal to or more than the predetermined value, as the slow-motion reproduction frame images S, among a plurality of frame images f, which constitute the moving image data D. Thereby, the slow-motion reproduction frame images S to be reproduced at a low reproduction frame rate can be properly identified on the basis of change in state of characteristic portions in each frame image f.

<Modification 2>

In the first embodiment, moving image data is always recorded at a high imaging frame rate so that frame images to be reproduced in slow motion can be selected at any time after imaging and recording. However, in the case where a user knows, in advance, that he/she will not reproduce the moving image partly in slow motion, the moving image does not need to be taken at a high imaging frame rate.

In view of the above, in Modification 2, first and second moving image recording modes are provided. The first moving image recording mode is a mode for recording normal moving image data, and a second moving image recording mode is a mode for recording moving image data, a part of which is to be reproduced in slow motion. A user can select one of the first and second moving image recording modes through a predetermined operation of an operation input section 10 (mode-setting section) before taking a moving image.

In the first moving image recording mode, a central control section 13 performs control to record the moving image data at an imaging frame rate equal to a predetermined reproduction frame rate, and then, performs control so as not to automatically perform the process for identifying the slow-motion reproduction frame images S or the process for reducing the number of the frame images other than the slow-motion reproduction frame images S.

In the second moving image recording mode, a central control section 13 performs control to automatically set an imaging frame rate to a rate higher than the predetermined reproduction frame rate and to record the moving image data, and then, performs control to automatically apply the process for identifying the slow-motion reproduction frame images S and the process for reducing the number of the frame images other than the slow-motion reproduction frame images S, to the recorded moving image data, similarly to the first embodiment.

In the imaging apparatus 100 in Modification 2, the high or normal imaging frame rate can be automatically set only by selecting the mode depending on necessity of reproduction of a moving image partially in slow motion. Thereby, moving image data reproducible partially in slow motion can be acquired easily. Additionally, if a user does not intend to reproduce a moving image partially in slow motion later, he/she can avoid taking the moving image at a high imaging frame rate, i.e., avoiding taking unnecessary frames. Thus, it is possible to avoid wasted memory consumption.

Manners for identifying the slow-motion reproduction frame images S in the first embodiment and Modifications 1 and 2 are merely examples, and the present invention is not limited to these examples. Any proper manner can be used.

In the first embodiment, the ratio of a difference value to a minimum difference value for each frame image f is used as a reference value for identifying the slow-motion reproduction frame images S. Alternatively, the ratio of a difference value to a maximum difference value for each frame image f may also be used as a reference value to identify a frame image f having this ratio equal to or less than a predetermined value as the slow-motion reproduction frame images S.

In Modification 1, the slow-motion reproduction frame images S is identified by setting a relative threshold value for determining the slow-motion reproduction frame images S on the basis of a maximum value and a minimum value among the magnitude of motion vectors. Alternatively, either the maximum value or the minimum value may be used as a reference value to set an absolute threshold value for determining the slow-motion reproduction frame images S.

In the first embodiment, the frame-number reduction processor 6c may also generate a representative frame image to be reproduced at the predetermined reproduction frame rate on the basis of the frame images f other than the slow-motion reproduction frame images S. In detail, the frame-number reduction processor 6c generates the representative frame image having a pixel value (for example, an average value or a median value) representing the predetermined number of frame images f by a predetermined calculation on the basis of pixel values of respective pixels in the predetermined number of frame images f.

Thereby, movement of the object in the frame images f other than the slow-motion reproduction frame images S can be smoothened by reproducing the representative frame image at the predetermined reproduction frame rate. Thereby, the reproduced moving image data D appears more naturally.

The configuration of the imaging apparatus 100 as an apparatus for processing a moving image in the first embodiment is merely one example, and the present invention is not limited to this example. The imaging apparatus 100 may be appropriately changed as long as the apparatus includes an acquiring section, an identifying section, and a processor.

In the first embodiment, functions as an acquiring section, an identifying section, and a processor are implemented by being driven by the image acquiring subsection 6a, the frame identifying section 6b, and the frame-number reduction processor 6c, respectively, under control of the central control section 13. However, the present invention is not limited to this. These functions may also be implemented by, for example, performing a predetermined program with a CPU in the central control section 13.

In detail, the program memory 12 for storing a program stores a program including routines for acquiring, identifying, and reducing number of frames therein. The routine for acquiring may then enable the CPU in the central control section 13 to function as an acquiring section which acquires the moving image data D of the object imaged at the predetermined imaging frame rate. The routine for identifying may also enable the CPU in the central control section 13 to function as a section which applies the predetermined analysis process to the moving image data D acquired by the acquiring section and identifies the slow-motion reproduction frame images S composed of a plurality of frame images f, . . . to be reproduced in slow motion among a plurality of frame images f, . . . which constitute the moving image data D. The routine for reducing number of frames may also enable the CPU in the central control section 13 to function as a processor which reduces the number of the frame images f other than the slow-motion reproduction frame images S among a plurality of frame images f, . . . which constitute the moving image data D at the predetermined ratio.

As the computer-readable medium storing the program for performing these processes, a ROM, a hard disk, a nonvolatile memory such as a flash memory, and a removable recording medium such as a CD-ROM, can be used, for example. A carrier wave may also be used as a medium for providing data of a program through a predetermined communication line.

The embodiment and modifications disclosed herein are merely examples, and the present invention is not limited to these. The scope of the present invention is claimed in the accompanying claims, but not in the above description, and the present invention can be changed and modified on the basis of the accompanying claims under the doctrine of equivalents.

In the following, the invention in the claims of this application originally filed is appended.

[Claim 1]

An apparatus for processing a moving image comprising:

an acquiring section which acquires moving image data of an object imaged at a predetermined imaging frame rate;

an identifying section which applies a predetermined analysis process to the moving image data acquired by the acquiring section and identifies a first frame image among a plurality of first frame images and second frame images constituting the moving image data, wherein the first frame images are to be reproduced in slow motion, and the second frame images are frame images other than the first frame images; and a processor which performs a frame-number reduction process to reduce the number of the second frame images at a predetermined ratio.

[Claim 2]

The apparatus according to claim 1, further comprising a recording section which records compressed and encoded moving image data, wherein the acquiring section acquires the moving image data recorded in the recording section;

the identifying section applies the predetermined analysis process to the first and second frame images obtained by expanding and decoding the moving image data acquired by the acquiring section; and the processor again compresses and encodes the moving image data, to which the frame-number reduction process has been applied, and allows the recording section to record the compressed and encoded moving image data.

[Claim 3]

The apparatus according to claim 1, wherein the acquiring section acquires moving image data of an object imaged at a predetermined imaging frame rate higher than a predetermined reproduction frame rate which is set for reproducing the moving image data; and the processor reduces the number of the second frame images according to a ratio between the imaging frame rate and the reproduction frame rate such that a time required to reproduce the second frame images at the reproduction frame rate corresponds to an actual time spent on taking the second frame images.

[Claim 4]
The apparatus according to claim 1, wherein
the processor does not reduce the number of the first frame images or reduces the number of the first frame images at a ratio lower than a ratio for the second frame images.

[Claim 5]
The apparatus according to claim 1, wherein
the identifying section detects a change in state of an object among the first and second frame images which constitute the moving image data through the predetermined analysis process; and
identifies a frame image, containing an object whose detected change in state corresponds to equal to or more than a predetermined value, as the first frame image.

[Claim 6]
The apparatus according to claim 5, wherein
the identifying section identifies a characteristic portion in each frame image through the predetermined analysis process; and
identifies a frame image, containing an object whose change in state of the specified characteristic portion corresponds to equal to or more than the predetermined value, as the first frame image.

[Claim 7]
The apparatus according to claim 6, wherein
the identifying section identifies a level of slow motion on a several-point scale for each frame image such that the level of slow motion becomes higher as the change in state of the characteristic portion of a frame image becomes larger; and
the processor changes a frame-number reduction ratio on the several-point scale such that the frame-number reduction ratio becomes lower as the level of slow motion becomes higher.

[Claim 8]
The apparatus according to claim 5, wherein
the identifying section calculates difference values among the first and second frame images which constitute the moving image data through the predetermined analysis process; and
identifies a frame image, having a difference value whose ratio to a minimum value for the calculated difference values is equal to or more than a predetermined value, as the first frame image.

[Claim 9]
The apparatus according to claim 5, wherein
the identifying section detects a largest-change portion which reflects a largest change in state in each frame image through the predetermined analysis process; and
identifies a frame image, whose largest-change portion corresponds to equal to or more than a predetermined value, as the first frame image.

[Claim 10]
The apparatus according to claim 1, wherein
the identifying section identifies a level of slow motion for each frame image; and
the processor changes a frame-number reduction ratio according to the level of slow motion identified by the identifying section.

[Claim 11]
The apparatus according to claim 10, wherein
the processor controls the frame-number reduction ratio for the first frame images such that the frame-number reduction ratio becomes lower as a change in state of a frame image becomes larger, based on a result of the predetermined analysis process.

[Claim 12]
The apparatus according to claim 1, wherein
the processor generates a representative frame image to be reproduced at a predetermined reproduction frame rate based on the second frame images in the frame-number reduction process.

[Claim 13]
The apparatus according to claim 1, further comprising:
a mode-setting section which sets one of a first moving image recording mode for recording normal moving image data, and a second moving image recording mode for recording moving image data wherein a part thereof is to be reproduced in slow motion; and
a control section which performs control to record the moving image data at an imaging frame rate equal to a predetermined reproduction frame rate, and then, performs control so as not to allow the identifying section and the processor to automatically perform the respective processes in the first moving image recording mode; and performs control to automatically set an imaging frame rate to a rate higher than the predetermined reproduction frame rate and to record the moving image data, and then, performs control to allow the acquiring section to acquire the recorded moving image data and to allow the identifying section and the processor to automatically perform the respective processes in the second moving image recording mode.

[Claim 14]
A method for processing a moving image using an apparatus, the method comprising:
(a) acquiring moving image data of an object imaged at a predetermined imaging frame rate;
(b) applying a predetermined analysis process to the acquired moving image data and identifying a first frame image among a plurality of first frame images and second frame images constituting the moving image data, wherein the first frame images are to be reproduced in slow motion, and the second frame images are frame images other than the first frame images; and
(c) performing a frame-number reduction process to reduce the number of the second frame images at a predetermined ratio.

The entire disclosure of Japanese Patent Application No. 2011-009429 filed on Jan. 20, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. An apparatus for processing a moving image comprising:
an acquiring section which acquires moving image data of an object imaged at a predetermined imaging frame rate;
an identifying section which applies a predetermined analysis process to the moving image data acquired by the acquiring section and identifies a first frame image among a plurality of first frame images and second frame images constituting the moving image data, wherein the first frame images are to be reproduced in slow motion, and the second frame images are frame images other than the first frame images; and
a processor which performs a frame-number reduction process to reduce a number of the second frame images at a predetermined ratio;

wherein:
the acquiring section acquires the moving image data of the object imaged at the predetermined imaging frame rate which is higher than a predetermined reproduction frame rate which is set for reproducing the moving image data; and the processor reduces the number of the second frame images according to a ratio between the imaging frame rate and the reproduction frame rate such that a time required to reproduce the second frame images at the reproduction frame rate corresponds to an actual time spent on taking the second frame images.

2. The apparatus according to claim 1, further comprising a recording section which records compressed and encoded moving image data, wherein:
the acquiring section acquires the moving image data recorded in the recording section;
the identifying section applies the predetermined analysis process to the first and second frame images obtained by expanding and decoding the moving image data acquired by the acquiring section; and
the processor again compresses and encodes the moving image data, to which the frame-number reduction process has been applied, and allows the recording section to record the compressed and encoded moving image data.

3. The apparatus according to claim 1, wherein the processor does not reduce a number of the first frame images or reduces the number of the first frame images at a ratio lower than a ratio for the second frame images.

4. The apparatus according to claim 1, wherein:
the identifying section identifies a level of slow motion for each frame image; and
the processor changes a frame-number reduction ratio according to the level of slow motion identified by the identifying section.

5. The apparatus according to claim 1, wherein the processor controls a frame-number reduction ratio for the first frame images such that the frame-number reduction ratio becomes lower as a change in state of a frame image becomes larger, based on a result of the predetermined analysis process.

6. The apparatus according to claim 1, wherein the processor generates a representative frame image to be reproduced at the predetermined reproduction frame rate based on the second frame images in the frame-number reduction process.

7. The apparatus according to claim 1, wherein the identifying section detects a change in state of an object among the first and second frame images which constitute the moving image data through the predetermined analysis process, and identifies a frame image, containing an object whose detected change in state is equal to or more than a predetermined value, as the first frame image.

8. The apparatus according to claim 7, wherein the identifying section calculates difference values among the first and second frame images which constitute the moving image data through the predetermined analysis process, and identifies a frame image, having a difference value whose ratio to a minimum value for the calculated difference values is equal to or more than a predetermined value, as the first frame image.

9. The apparatus according to claim 7, wherein the identifying section detects a largest-change portion which reflects a largest change in state in each frame image through the predetermined analysis process, and identifies a frame image, whose largest-change portion corresponds to equal to or more than a predetermined value, as the first frame image.

10. The apparatus according to claim 7, wherein the identifying section identifies a characteristic portion in each frame image through the predetermined analysis process, and identifies a frame image, containing an object whose change in state of the specified characteristic portion is equal to or more than the predetermined value, as the first frame image.

11. The apparatus according to claim 10, wherein:
the identifying section identifies a level of slow motion on a several-point scale for each frame image such that the level of slow motion becomes higher as the change in state of the characteristic portion of a frame image becomes larger; and
the processor changes a frame-number reduction ratio on the several-point scale such that the frame-number reduction ratio becomes lower as the level of slow motion becomes higher.

12. An apparatus for processing a moving image comprising:
an acquiring section which acquires moving image data of an object imaged at a predetermined imaging frame rate;
an identifying section which applies a predetermined analysis process to the moving image data acquired by the acquiring section and identifies a first frame image among a plurality of first frame images and second frame images constituting the moving image data, wherein the first frame images are to be reproduced in slow motion, and the second frame images are frame images other than the first frame images;
a processor which performs a frame-number reduction process to reduce a number of the second frame images at a predetermined ratio;
a mode-setting section which sets one of a first moving image recording mode for recording normal moving image data, and a second moving image recording mode for recording moving image data wherein a part thereof is to be reproduced in slow motion; and
a control section which (i) performs control to record the moving image data at an imaging frame rate equal to a predetermined reproduction frame rate, and then, performs control so as not to allow the identifying section and the processor to automatically perform their respective processes in the first moving image recording mode, and (ii) performs control to automatically set an imaging frame rate to a rate higher than the predetermined reproduction frame rate and to record the moving image data, and then, performs control to allow the acquiring section to acquire the recorded moving image data and to allow the identifying section and the processor to automatically perform their respective processes in the second moving image recording mode.

13. A method for processing a moving image using an apparatus, the method comprising:
acquiring moving image data of an object imaged at a predetermined imaging frame rate;
applying a predetermined analysis process to the acquired moving image data and identifying a first frame image among a plurality of first frame images and second frame images constituting the moving image data, wherein the first frame images are to be reproduced in slow motion, and the second frame images are frame images other than the first frame images; and
performing a frame-number reduction process to reduce a number of the second frame images at a predetermined ratio;
wherein:
the predetermined imaging frame rate at which the moving image data of the object is acquired is higher than a predetermined reproduction frame rate which is set for reproducing the moving image data; and in performing the frame-number reduction process, the number of the second frame images is reduced according to a ratio between the imaging frame rate and the reproduction frame rate such that a time required to reproduce the second frame images at the reproduction frame rate corresponds to an actual time spent on taking the second frame images.

14. A method for producing a moving image using an apparatus, the method comprising:

acquiring moving image data of an object imaged at a predetermined imaging frame rate;

applying a predetermined analysis process to the acquired moving image data and identifying a first frame image among a plurality of first frame images and second frame images constituting the moving image data, wherein the first frame images are to be reproduced in slow motion, and the second frame images are frame images other than the first frame images;

performing a frame-number reduction process to reduce a number of the second frame images at a predetermined ratio;

setting one of a first moving image recording mode for recording normal moving image data, and a second moving image recording mode for recording moving image data wherein a part thereof is to be reproduced in slow motion; and (i) performing control to record the moving image data at an imaging frame rate equal to a predetermined reproduction frame rate, and then, performing control so as not to allow the predetermined analysis process and the frame-number reduction process to be automatically performed in the first moving image recording mode, and (ii) performing control to automatically set an imaging frame rate to a rate higher than the predetermined reproduction frame rate and to record the moving image data, and then, performing control to allow acquiring of the recorded moving image data and to allow the predetermined analysis process and the frame-number reduction process to be automatically performed in the second moving image recording mode.

* * * * *